(12) United States Patent
Lagares-Corominas

(10) Patent No.: US 6,467,403 B1
(45) Date of Patent: Oct. 22, 2002

(54) STUFFING-DOSING MACHINE FOR PASTY FOOD PRODUCTS

(75) Inventor: Narciso Lagares-Corominas, Girona (ES)

(73) Assignee: Metalquimia, SA, Girona (ES)

( * ) Notice: Subject to any disclaimer, the term of this patent is extended or adjusted under 35 U.S.C. 154(b) by 0 days.

(21) Appl. No.: 09/875,509

(22) Filed: Jun. 6, 2001

Related U.S. Application Data

(63) Continuation of application No. PCT/ES97/00318, filed on Dec. 30, 1997.

(30) Foreign Application Priority Data

Dec. 5, 1997 (ES) ................................................ 9702538

(51) Int. Cl.$^7$ ............................ A23L 1/00; A22C 11/00; A22C 11/06; A22C 17/00; A23P 1/00
(52) U.S. Cl. ................... 99/472; 99/450.1; 99/450.6; 99/450.7; 99/494; 222/368; 222/380; 417/339; 417/457; 452/30; 452/35
(58) Field of Search .................. 99/352–355, 472, 99/454, 494, 450.1, 450.6, 450.7, 532, 516; 452/30, 31, 35, 42, 41, 45, 47, 88; 222/380, 368, 189.11; 417/457, 469, 339, 517, 900; 141/156, 160, 242, 243; 425/133.1, 131.1, 192 R, 382.3, 190, 112, 113; 426/502, 512, 513, 516, 282

(56) References Cited

U.S. PATENT DOCUMENTS

| | | | | |
|---|---|---|---|---|
| 2,568,491 A | * | 9/1951 | Edwards .................. 452/45 X |
| 3,868,048 A | * | 2/1975 | Soodalter .................... 222/380 |
| 4,160,634 A | * | 7/1979 | Huang .................. 99/450.6 X |
| 4,533,300 A | * | 8/1985 | Westerlund et al. .... 417/483 X |
| 4,697,505 A | * | 10/1987 | Brewer et al. ............. 99/450.1 |
| 4,700,899 A | * | 10/1987 | Powers et al. ............ 99/472 X |
| 4,703,688 A | * | 11/1987 | Ochs .......................... 99/450.8 |
| 4,949,430 A | * | 8/1990 | Stanek ......................... 99/494 |
| 4,958,412 A | * | 9/1990 | Stanek ......................... 99/494 |
| 4,989,505 A | * | 2/1991 | Mally ........................... 99/483 |
| 5,083,507 A | * | 1/1992 | Van Haren .................... 99/472 |
| 5,673,612 A | * | 10/1997 | Svendsen ................... 99/450.7 |
| 6,117,467 A | * | 9/2000 | Huling ................. 99/450.7 X |

* cited by examiner

Primary Examiner—Timothy F. Simone
(74) Attorney, Agent, or Firm—Jacobson Holman, PLLC

(57) ABSTRACT

The invention relates to a stuffing-dosing machine which comprises a container (1) which receives the food material and which is subjected to a vacuum (V), means for removing and impulsing the food material towards compaction-stuffing cavities, two alternating stuffing cylinders (2) and a rotary collector valve (9) synchronized with said cylinders for the selective collection and distribution of material to an outlet conduit. Piston heads (5) of the cylinders (2) are inside the container (1), the first portion (B) of the stroke (A) of the cylinder (2) taking place in a narrow area (1a) of the container (1) wherein the piston heads (5) stir and impulse the food material and a second portion (C) of the stroke (A) takes place inside stuffing-dosing chambers (4) in the lower terminal portion of the container (1) of which the internal walls match the piston heads (5) and of which the stuffing-dosing chambers (4) are adjacent to the compaction-stuffing cavities.

7 Claims, 3 Drawing Sheets

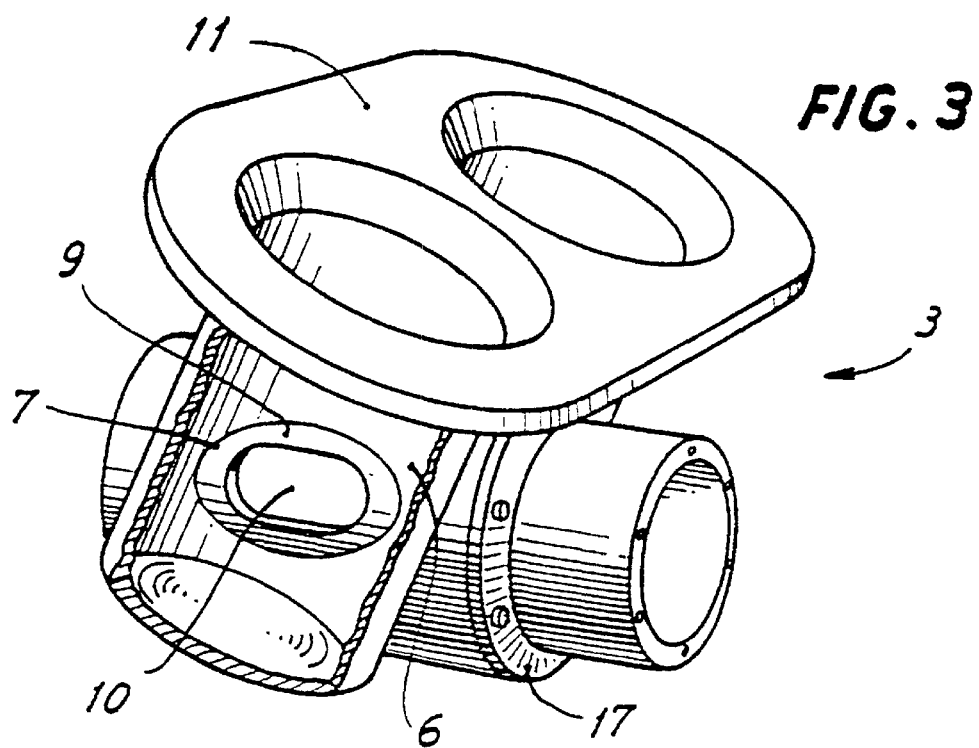
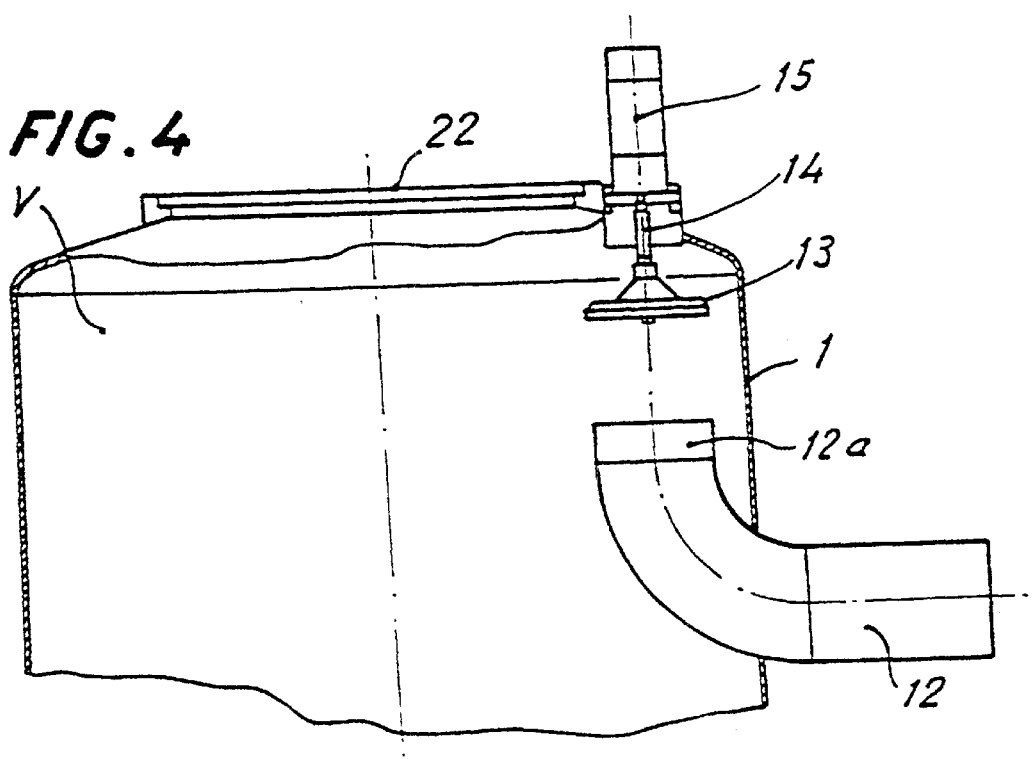

& 1

STUFFING-DOSING MACHINE FOR PASTY FOOD PRODUCTS

This is a Continuation Application of PCT International Application No. PCT/ES97/00318, filed Dec. 30, 1997.

FIELD OF THE INVENTION

This invention relates to a stuffing-dosing machine for pasty food products such as, namely, whole, chopped and sliced meat or meat mass, cheeses, fine pastes and jams, of the type comprising: a container for a food product which may be sealed in which vacuum is produced; means for removing said food product and impelling it towards stuffing-dosing chambers; two alternating stuffing cylinders, to push, by means of related pistons, the food product from the stuffing chamber; collecting ducts and a rotatory collecting-stuffing valve, the motion of which is synchronized with that of said stuffing cylinders to alternatively let pass the food product impelled by one or the other cylinder, so that it results in a single virtually continuous flow of said food product at the outlet of said collecting-distributing valve.

BACKGROUND OF THE INVENTION

Machines of this type are largely well-known, and there may be noted namely as background of patents U.S. Pat. Nos. 3,868,048, 4,533,300 and applications for patent WO-A-89/03479, WO-A-95/30087, WO-A-96/06029, WO-A-96/07327 and WO-A-96/14492.

In all of them, assemblies provided with two alternatively operating pistons are disclosed, having a collecting system and a distributing valve, and correspond to applications for food industry and namely for meat industry.

The principle of transferring pasty products by means of two cylinders having alternatively operating pistons is well-known and so patent ES-A-8400550 discloses a machine having said characteristic for handling concrete.

Patent WO-A-95/30087 discloses with details a rotatory valve for a double piston pump, provided with a device which facilitates rotor withdrawal to proceed to clean said valve.

Patent WO-A-96/07327 discloses a pump for food products coming from a container in which vacuum has been produced, provided with two alternative motion pistons and a rotatory valve of above mentioned type, as well as a system to control both pistons speed and run path.

In said pump the two cylinders are arranged parallel to each other in horizontal position so that recesses where said cylinders respective pistons or piston heads operate remain open at their top, immediately under the outlet of a container of food product under vacuum, provided with means to remove and impel said product toward said recesses. Each cylinder has available an external moving lining which acts in a first step closing and defining a stuffing chamber within which related piston acts in a second step. Two conducting ducts each connected to the outlet of one of the stuffing chambers converge in a rotatory valve having a motion synchronized with that of both pistons which provides alternatively passage to food product coming from one or the other conducting duct toward a single output duct from which a continuous flow of said food product is obtained.

This arrangement has the drawback to have a great complexity of mechanisms with reference to duplicating operations for each piston and its related external moving lining and because of the mechanisms of the means to remove and impel food product within the container toward stuffing recesses. Also it has the drawback to require much room because of the horizontal arrangement, external to the container, of the cylinders, the existence of the two conducting ducts, and the side arrangement of the two conducting ducts inlets to the rotatory valve which requires a large gap between them.

DESCRIPTION OF THE INVENTION

The object of this invention is to overcome said drawbacks providing a stuffing-dosing machine for pasty food products having quite simple mechanisms a compact design and easy cleaning, including less moving parts and in addition an operating cycle having less number of steps and therefore speedier.

This object is achieved in a machine according to this invention the basic characteristics of which are disclosed in claim 1.

The invention is inspired in a structure of a machine of this type disclosed in patent ES-A-2015660 of the same applicant where is disclosed the use of an hydraulic cylinder the piston of which is inserted up to the interior of the recess of a vacuum tight container and is ended in a faller-like plate, to push meat masses toward a stuffing recess.

The machine involved comprises now a vacuum food product container having two stuffing cylinders located in tilted position, parallel and close to each other, forming a small angle with the vertical and outside the container, housed in a hollow of its side walls so that their related piston bodies and heads directly act within said container. In a first length of their respective two direction runs said pistons act removing making easier entrapped air exhaust and impelling the mass of food product contained in a narrowed area (frustum-shaped in the example of embodiment disclosed thereafter) of the container bottom towards two stuffing-dosing chambers located at the bottom of said container each of said chambers being coaxially aligned with the axis of a respective piston. Within said two chambers, the pistons perform a second length of their runs, very accurately controlled by regulating means with their respective piston heads adjusted to the internal walls of said chambers, with which food product stuffing and dosing functions are performed.

In order to provide a continuous flow of food product during a predetermined time of operation of the alternative driven pistons a rotatory valve let alternatively pass, in a synchronized way with respect to the pistons action, the food product coming from one or the other stuffing-dosing chamber. Said valve is located directly under said stuffing-dosing chambers and interposed between respective compacting-stuffing recesses which remain coaxially aligned with said stuffing-dosing chambers which they extend. So a third cylindric recess is located between the two compacting and stuffing recesses, forming a certain tilting angle with respect to them, so that it intersects both in same way forming respective communication openings. A cylindric valve body provided with a side port may rotate by sliding within said third recess so that, impelled by an alternative drive such as an hydraulic motor, said port remains alternatively facing each of said communication openings. This way, through the outlet of the third cylindric recess a continuous flow of food product is produced which may be stuffed and lead for example to a vacuum sealing station to a thermoforming station or any other machine for complementary operations of product finishing and packing.

In the machine according to the invention, piston speed, run path and alternation as well as valve synchronization are adjustable. Thus by programming an indefinitely repeated given cycle a continuous flow production is achieved. On the contrary, by programming cycles composed of complete pistons actions or fractions thereof, with discrete stops between said cycles a production in separate portions is achieved with amounts accurately dosed.

The food product goes into said container using the suction force itself provided by the vacuum existing within said container, as already applied to the machine disclosed in said patent ES-A-2015660 of the applicant himself.

Means have been provided to control the level within the container between a maximum and a minimum in order that in the moment the meat has access to the stuffing-dosing chambers an essentially constant pressure is achieved.

Also side ports have been provided, which have advantageously transparent covers, which allows the access within the container for its cleaning and the pistons are removable, connectable with a straightforward junction to related cylinder rod or moving body, to facilitate the assembly periodical cleaning task.

Summarizing above disclosed, we have that:

First, the two pistons driving cylinders are located in a tilted position close to the vertical, outside the container preventing any contamination problem.

Second, the rods or moving bodies and the piston heads of said cylinders directly act within said container. This way, in a first length of their run, said piston heads perform their function of removing, facilitating entrapped air exhaust and downwardly impelling the food product which is located in the narrowed area of the bottom of said container, therefore other additional mechanisms are not required to carry out such tasks, as those incorporated in the apparatuses disclosed in above patents background.

Third, the special shape of the rotatory valve of a machine according to the invention easily dismounted for cleaning makes possible that stuffing-dosing chambers are located so close to each other as the very geometry allows it. In addition, thanks to the location of the valve immediately under said chambers and embedded between the compacting-stuffing recesses additional conduction ducts the former models incorporated result unnecessary from said chambers up to the valve body.

Last, by providing level control means in the container they guarantee an even pressure of meat or other pasty product in the moment of having access to the stuffing chambers.

The advantages of a machine according to the invention with respect to the former ones consist in reducing mechanisms, drives and moving parts which means a great compactness of said machine and a simple and safe operation, easy cleaning and servicing, obtaining a higher performance by shortening the stuffing cycle.

To best understand the invention a detailed description is found below with reference to the drawings attached, said drawings being for sole illustration purpose of a possible embodiment of the invention which in no case must be purported as limiting it.

SHORT DESCRIPTION OF THE DRAWINGS

FIG. 3 is a part section perspective view of an assembly which comprises the compacting-stuffing recesses and the rotatory valve of a machine according to the invention.

FIG. 4 is a sectional elevation view of the top of a container of a machine according to the invention, with a food product inlet device.

DETAILED DESCRIPTION OF AN EXAMPLE OF EMBODIMENT

Figure 1:
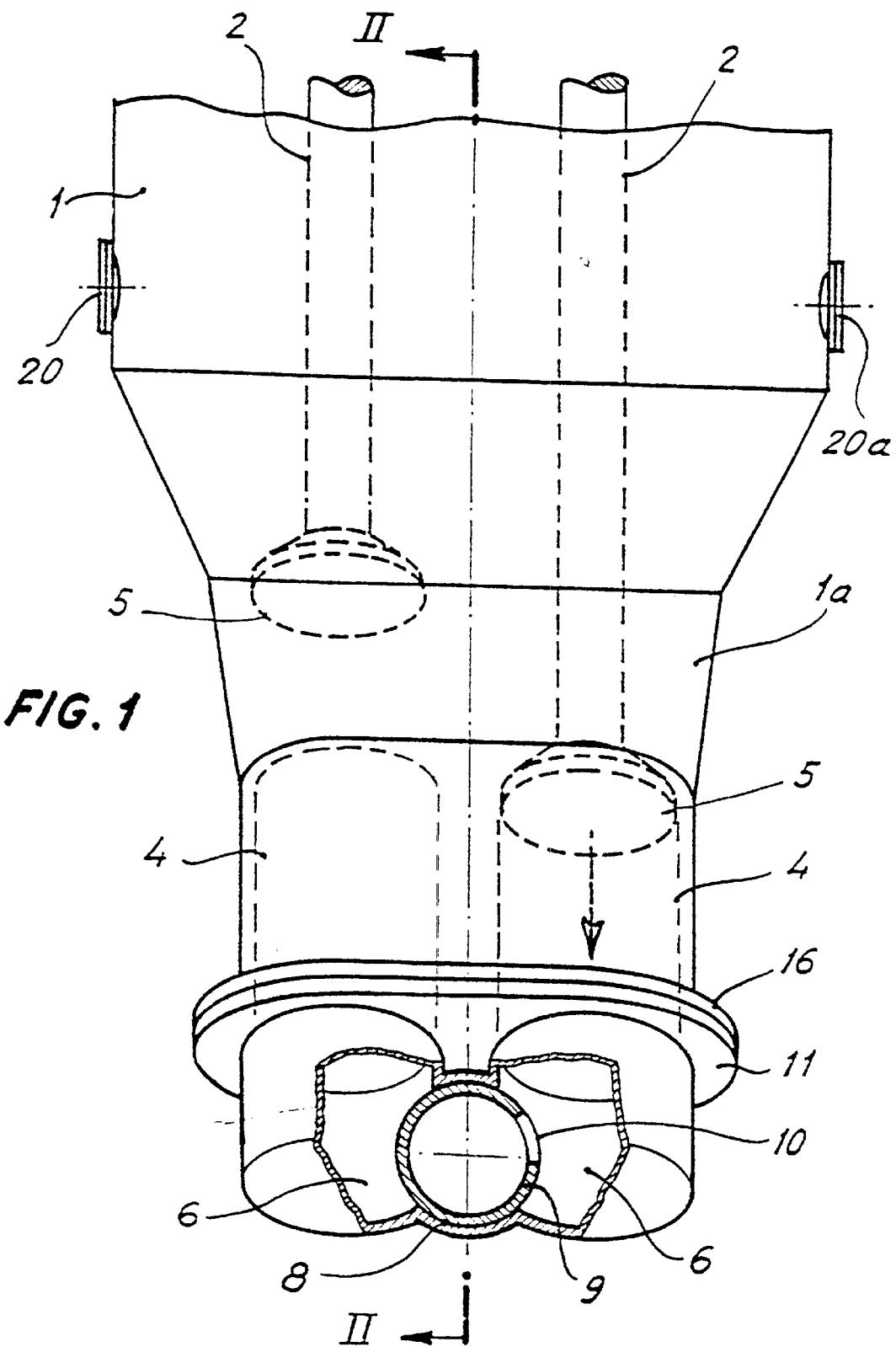
FIG. 1 is a part section front view of the bottom of the container with a collecting valve of a machine according to the invention.
Figure 2:
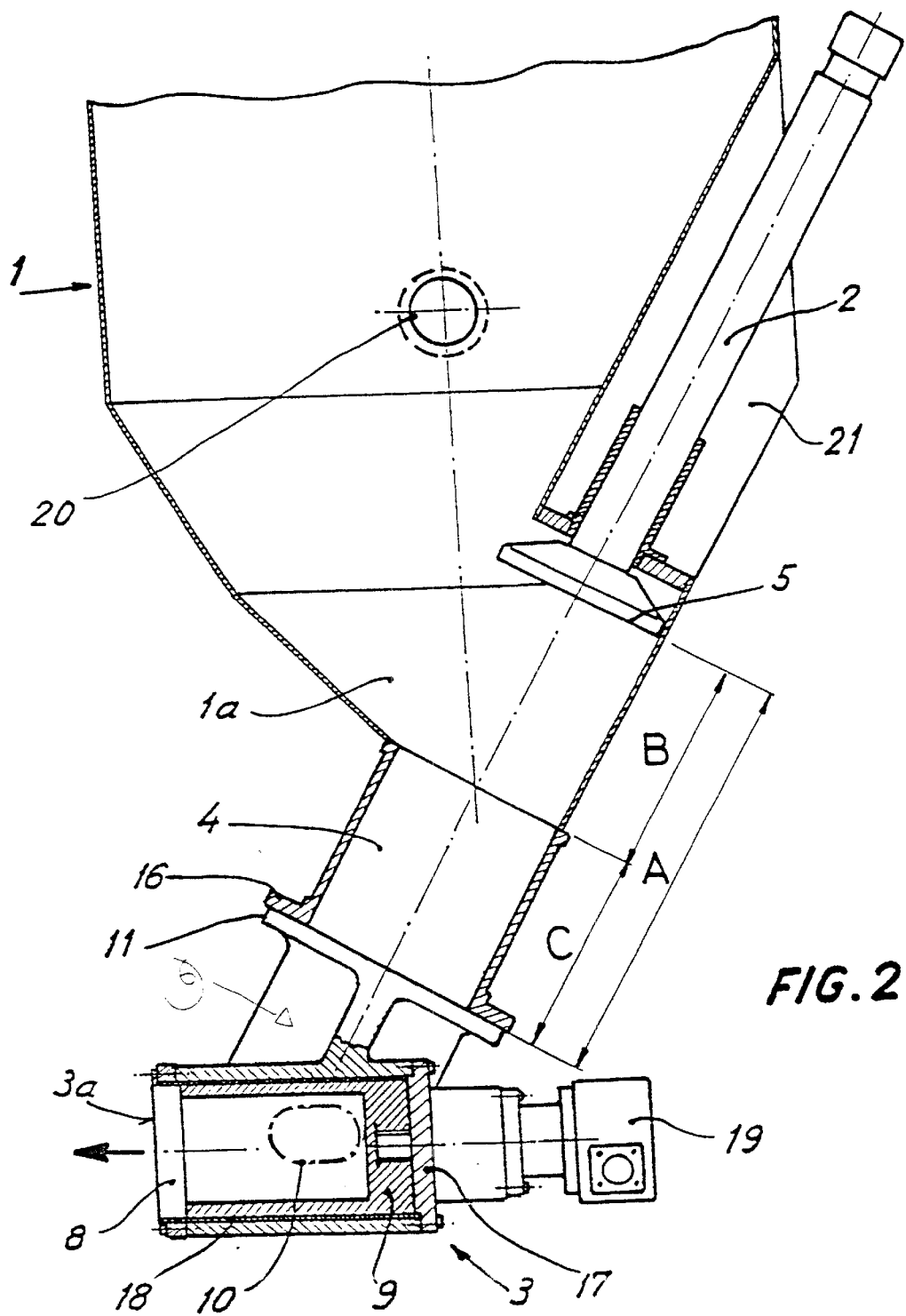
FIG. 2 is a part section side view of same area shown in FIG. 1.

In FIGS. 1 and 2 a container 1 can be seen having a narrowed area 1a at its bottom which is communicated with two stuffing-dosing chambers 4 which are cylindric, parallel and close to each other the axes of which form a small angle with the vertical. Two stuffing pistons 2 are arranged in external housings 21 so that they may act within said container with the path of run A of each of them aligned with the axis of a respective stuffing-dosing chamber 4.

Runs A of said pistons can be in both directions. A first portion B of said runs A is carried out within the narrowed area 1a of container 1 where the piston heads 5 perform the function of removing and impelling the food product towards said stuffing-dosing chambers depending on which is their direction of displacement. A second portion C of said runs A is carried out within said stuffing-dosing chambers 4 where, thanks to the adjustment of the piston heads 5 with the inner walls of their respective chambers 4 pushing function on the mass product entrapped there is performed.

The whole assembly of container 1, stuffing cylinders 2 and stuffing-dosing chambers 4 is lowerable by rotation about an hinge not shown in the drawings such as it was already disclosed in patent ES-A-2015660 of the applicant, to facilitate dust, recesses and container cleaning.

Located immediately under the stuffing-dosing chambers 4 there are two compacting-stuffing recesses 6 each aligned coaxial with respective stuffing-dosing chamber 4 formed in a rotatory collecting valve body 3 which includes a supporting flange for tight seat 11 the top surface of which remains coplanar with the lower surface of a related flange 16 which ends the lower end of the stuffing-dosing chambers when said assembly is located in working position.

Said rotatory collecting valve body 3 (see also FIG. 3) also incorporates a third cylindric recess 8 arranged in an intermediate position between the two compacting-stuffing recesses 6 forming a given angle with them so that said third cylindric recess 8 equally intersects each of said compacting-stuffing recesses 6 forming communicating openings 7.

A distributing bucket 9 or cylindric glass-shaped rotatory collecting valve may freely rotate within the third cylindric recess 8 driven by a related alternating device such as an hydraulic motor 19 through the rear cover 17 so that a side port 10 of said distributing bucket 9 remains alternatively facing one or the other communicating opening 7.

Said rotatory collecting valve is provided with related tight sealing means and a thin anti-friction lining 18 between the internal wall of the third cylindric recess 8 and the external wall of the distributing bucket 9.

The drive of said rotatory collecting valve 9 is synchronized with the drives of the cylinders 2 so that when one of the pistons 5 impels a portion of food product mass within its related stuffing-dosing chamber 4, said portion of mass passes to related compacting-stuffing recess 6 where it is compacted and where it passes thanks to movement synchronization through related communicating opening 7 and through the side port 10 within the distributing bucket 9. From said distributing bucket 9 the food product is pushed through a single outlet 3a at the front end of the third cylindric recess 8 towards a duct not shown in the drawings which will lead it to its further destination.

When one of the two cylinders 2 has completed its run A, i.e., when it is at the end point of the second portion C of said run A the other cylinder 2 is located at the inlet of its related stuffing-dosing chamber 4, i.e. at the beginning of said second portion C of the run A on the point to start its action. In this moment the distributing bucket 9 of the rotatory collecting valve makes a quick rotation closing the communication with the action of the first of the pistons and opening it with the action of the second piston. When the path of portion C of run A of second cylinder arrives to its end the cycle is re-started. Of the repetition of said cycle a non-stop continuous single flow of food product is obtained through the rotatory collecting valve or bucket 9 outlet 3a.

By means of said cylinders 2 the speed and run control and of discrete stops of their motions, it is possible to obtain an intermittent flow in portions accurately dosed of food product corresponding to a given number of actions of the cylinder or fractions of said action.

Although not shown level detecting means have been provided which guarantee that the load of product within the container 1 is always ranging between a maximum and a minimum in order to assure an evenness of the pressure obtained in the moment when the product to be stuffed is entering within the stuffing-dosing chambers 4. Said level control means may be for example photoelectric or the like.

The structure according to the invention also provide an easy cleaning very effective for all its members for which purpose it is possible to have access to the interior of the recess through a top cover 22 (FIG. 4) or through side ports 20, 20a, at medium height in the top cylindric wall of the container 1 and through the lower part thereof, or stuffing area, bearing in mind that said container is hinged to the lower body 3 so that it can tilt driven by a related hydraulic cylinder same as the background, often disclosed in patent ES-A-2015660.

It has also be provided that the pistons 5 can be easily taken apart from their rods or moving parts of cylinders 2 (for example by means of a connection of straightforward junction, such as a bayonet or the like) so that when driving cylinder 2 the piston 5 or faller is withdrawn by the container lower end and after dismounting the interior of container 1 can be very effectively cleaned and the stuffing-dosing chamber.

FIG. 4 shows a device for food product mass entering within the container 1 in the interior of which vacuum V has been produced according to an already traditional system and applied to the applicant in its former patent ES-A-2015660. Said device is composed of an inlet tube 12 which perpendicularly crosses the container 1 side wall in a situation close to the top part thereof. The external end of aid duct 12 may be connected through a duct to an external source of food product while the inner end 12a of it is curved upwardly so that it may be coaxially facing a valve plug 13 mounted at the end of a rod 14 of a driving piston 15. When said piston 15 is downwardly driven, the periphery of the valve plug 13 is resting on the edge of the inner end 12a opening upwardly curved of the inlet duct 12 therefore preventing the passage of the food product through it. When said piston 15 is upwardly driven, the passage through said opening of the end 12a of duct 12 remains open, so that the higher pressure existing at the exterior due to the vacuum V produced within it impels the food product toward the interior of said container 1.

This invention being sufficiently disclosed in order a man of the art can implement it, it is requested that its object is extended to any variations of details which do not impair its essence, such as meat or other product loading methods, shape of the container, etc.

What is claimed is:

1. Stuffing-dosing machine for pasty food products, under vacuum, such as whole chopped and sliced meat or meat mass of the type comprising:

a container (1) for a food product to be stuffed with tight sealing means, connected to a device to produce a vacuum (V) within it;

means for removing and impelling the food product down the bottom of said container and for passing it to two compacting-stuffing recesses, in the mouthpiece of which said container is hinged;

two stuffing cylinders (2) of alternating operation, each associated to one of said compacting-stuffing recesses; and a rotatory collecting valve (9) having a motion synchronized with said cylinders, to selectively collect the product from one or the other compacting-stuffing recess and its distribution to a single outlet duct;

characterized in that piston heads (5) of said stuffing cylinders (2) are located within said container (1), a first portion (B) of the run (A) in two directions of each of said cylinders (2) being performed within a narrowed area (1a) of the container lower part (1) so that at said area (1a) of said piston heads (5) of said cylinders (2) they act as said means to remove and facilitate the entrapped air exhaust and impel the food product and a second portion (C) of said run (A) is performed within related stuffing-dosing chambers (4) at the lower end part of the container the inner walls of which are adjusted with respective piston heads (5) of each of said two cylinders (2) and said stuffing-dosing chambers (4) being placed immediately close to said compacting-stuffing recesses (6) which are in adjacent arrangement very close to each other and are provided with a side opening (10) which may be facing an opening of said rotatory collecting valve (9).

2. Machine according to claim 1 characterized in that said compacting-dosing recesses (6) are defined in a body or block (3) including said rotary collecting valve, and in that said container (1) being hinged by its bottom, coupled with a tight closing at the inlet of said recesses (6).

3. Machine according to claim 1 characterized in that the two direction runs (A) of cylinders (2) are parallel and close to each other adopting an oblique path which forms a small angle with the vertical and said runs remains coaxially aligned with said stuffing-dosing chambers (4) and compacting-stuffing recesses (6).

4. Machine according to the claim 1 characterized in that said rotatory collecting valve (9) is embedded between the compacting-stuffing chambers forming an assembly of a block (3) provided with a supporting flange for tight seat (11) of the container bottom (1) hinged to the mouthpiece of said compacting-stuffing chambers (6) which adopt a cylindric shape being arranged very close to each other and with their axes being parallel, each of them coaxially facing a respective stuffing-dosing chamber (4) and symmetrically intercepted by a third cylindric recess (8) the axis of which forms a given angle with the two former recesses so that two respective communicating side openings (7) are formed and within said third cylindric recess (8) a distributing bucket (9) can tightly rotate provided with a side port (10) which may remain alternatively facing each of said two communicating side openings (7) thanks to alternating rotatory driving means synchronized with the alternating motion of the two stuffing cylinders (2).

5. Machine according to claim 1 characterized in that it includes level control means in the container (1) to guarantee that the food product level within it is always ranging from a maximum to a minimum.

6. Machine according to claim 1 characterized in that the piston heads (5) are removable straightforward connection means thereof having been provided at respective rods or moving bodies of the cylinders (2).

7. Machine according to claim 1 characterized in that side ports (20, 20a) have been provided to have access within the container for cleaning tasks, said ports having available tight closing covers.

* * * * *